(12) United States Patent
Dixith et al.

(10) Patent No.: US 11,768,740 B2
(45) Date of Patent: Sep. 26, 2023

(54) RESTORING OPERATION OF DATA STORAGE SYSTEMS AT DISASTER RECOVERY SITES

(71) Applicant: International Business Machines Corporation, Armonk, NY (US)

(72) Inventors: Dileep Dixith, Hyderabad (IN); Subramaniyan Nallasivam, Bangalore (IN); Amey Gokhale, Pune (IN); Satishreddy Konala, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 16/370,424

(22) Filed: Mar. 29, 2019

(65) Prior Publication Data

US 2020/0310922 A1 Oct. 1, 2020

(51) Int. Cl.
*G06F 11/00* (2006.01)
*G06F 11/14* (2006.01)
*G06F 16/182* (2019.01)
*G06F 21/56* (2013.01)

(52) U.S. Cl.
CPC ........ *G06F 11/1469* (2013.01); *G06F 16/182* (2019.01); *G06F 21/566* (2013.01); *G06F 2201/80* (2013.01); *G06F 2201/82* (2013.01); *G06F 2221/034* (2013.01)

(58) Field of Classification Search
None
See application file for complete search history.

(56) References Cited

U.S. PATENT DOCUMENTS

| 8,977,886 | B2 | 3/2015 | Bauer et al. |
| 9,430,337 | B1 | 8/2016 | Gupta et al. |
| 9,501,365 | B2 | 11/2016 | Parab |
| 9,588,977 | B1 | 3/2017 | Wang et al. |
| 2011/0258482 | A1* | 10/2011 | Nightingale ........ G06F 11/1662 711/170 |

(Continued)

FOREIGN PATENT DOCUMENTS

EP 3026562 A1 6/2016

OTHER PUBLICATIONS

NPL: Google Scholar/Patents search—text refined (Year: 2020).*

(Continued)

*Primary Examiner* — Christopher S McCarthy
(74) *Attorney, Agent, or Firm* — Zilka-Kotab, P.C.

(57) ABSTRACT

A computer-implemented method, according to one embodiment, is for restoring operation of a data storage system at a disaster recovery site. The computer-implemented method includes: in response to a disaster event occurring at a primary site, receiving an inode list from a cloud storage site, and receiving configuration information from the cloud storage site. The cloud storage site includes a backup copy of data that is stored at the primary site. Moreover, the inode list and the configuration information are used to construct a filesystem at the disaster recovery site. The filesystem at the disaster recovery site does not include a copy of the data that is stored at the primary site, but rather the filesystem includes a plurality of metadata stubs. The filesystem is further used to satisfy I/O commands that are received.

20 Claims, 11 Drawing Sheets

(56) References Cited

U.S. PATENT DOCUMENTS

| | | | |
|---|---|---|---|
| 2014/0006357 A1* | 1/2014 | Davis | G06F 16/182 |
| | | | 707/667 |
| 2014/0007239 A1* | 1/2014 | Sharpe | G06F 16/137 |
| | | | 726/24 |
| 2019/0236272 A1* | 8/2019 | Piatt | G06F 21/566 |
| 2020/0250149 A1* | 8/2020 | Bono | H04L 67/1097 |

OTHER PUBLICATIONS

Google Scholar/Patents—text refined (Year: 2021).*
Google Scholar/Patents search—text refined (Year: 2023).*
Dixith, D., "Disaster Recovery for Transparent Cloud Tiering using SOBAR," IBM, Aug. 13, 2018, 3 pages, Retireved from https://developer.ibm.com/storage/2018/08/13/disaster-recovery-transparent-cloud-tiering-using-sobar/.
Nemoto et al., "Directory-Aware File System Backup to Object Storage for Fast On-Demand Restore," International Journal of Smart Computing and Artificial Intelligence, vol. 1, No. 1, 2017, pp. 1-19.

* cited by examiner

RESTORING OPERATION OF DATA STORAGE SYSTEMS AT DISASTER RECOVERY SITES

BACKGROUND

The present invention relates to data storage systems, and more specifically, this invention relates to the accelerated restoration of data storage system operation at a disaster recovery site.

Data consumption has grown rapidly, in part because data has been increasingly gathered by various processes and products such as mobile devices, remote sensing devices, software logs, cameras, microphones, radio-frequency identification (RFID) readers and wireless sensor networks. As data consumption continues to grow, so does the storage requirements associated with actually maintaining this data. Similarly, data accessibility has also become increasingly desirable.

While on premise data storage configurations have had difficulty accommodating these increases in data storage and data accessibility, cloud storage has been able to provide some relief. Cloud storage is a model of data storage in which the digital data is stored in logical pools which correspond to physical storage. The physical storage spans multiple servers, and the physical environment is typically managed by a host, e.g., cloud storage provider. These cloud storage providers are responsible for keeping the data available and accessible, and the physical environment protected and running. People and organizations buy or lease storage capacity from the providers to store user, organization, or application data. It follows that cloud storage can be implemented in conjunction with on premise data storage configurations in order to achieve a distributed data storage system.

SUMMARY

A computer-implemented method, according to one embodiment, is for restoring operation of a data storage system at a disaster recovery site. The computer-implemented method includes: in response to a disaster event occurring at a primary site, receiving an inode list from a cloud storage site, and receiving configuration information from the cloud storage site. The cloud storage site includes a backup copy of data that is stored at the primary site. Moreover, the inode list and the configuration information are used to construct a filesystem at the disaster recovery site. The filesystem at the disaster recovery site does not include a copy of the data that is stored at the primary site, but rather the filesystem includes a plurality of metadata stubs. The filesystem is further used to satisfy input/output (I/O) commands that are received.

A computer program product, according to another embodiment, is for restoring operation of a data storage system at a disaster recovery site. The computer program product includes a computer readable storage medium having program instructions embodied therewith. Moreover, the program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
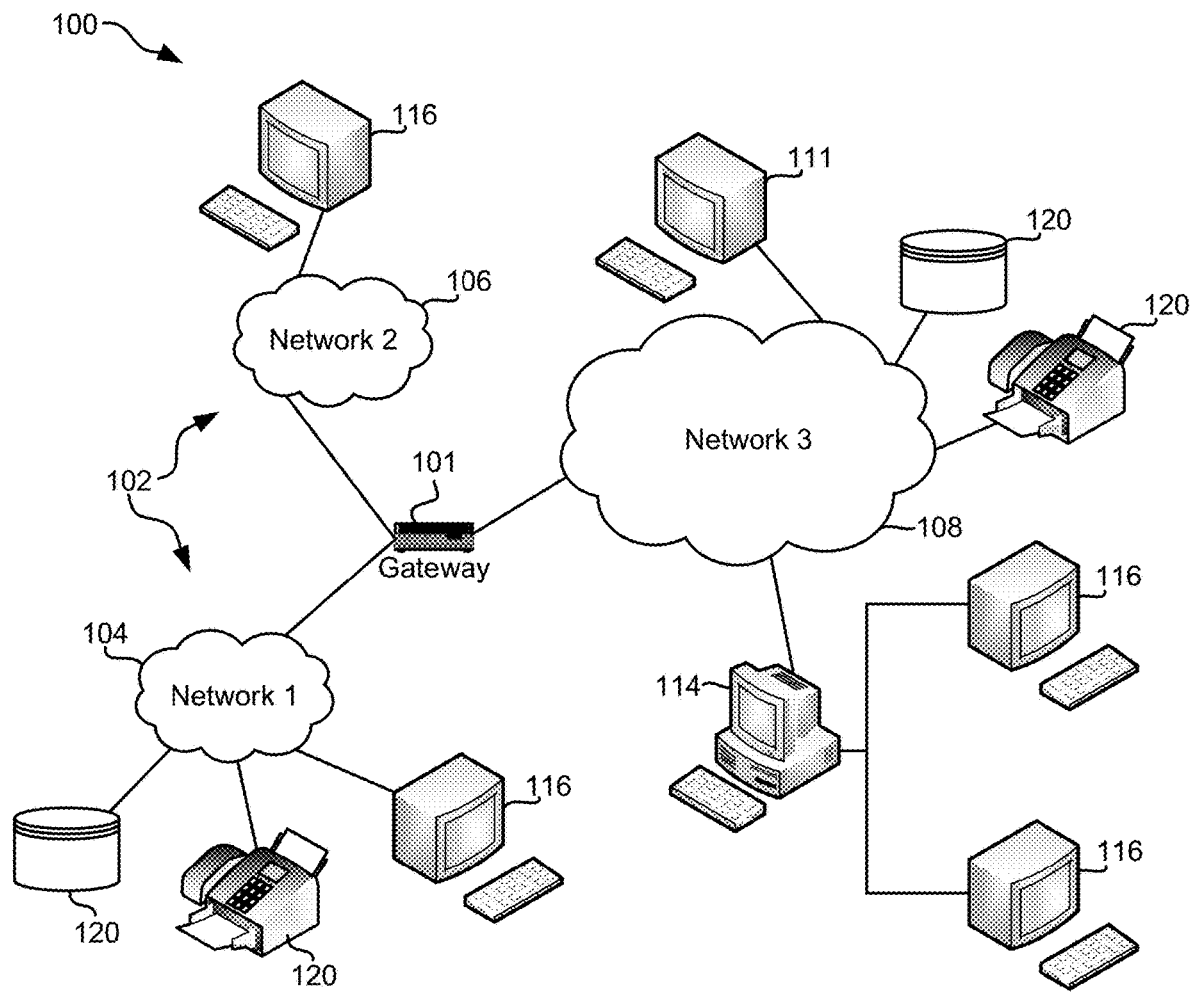
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for restoring operation of data storage systems at disaster recovery sites. Various ones of the approaches included herein only copy data to the disaster recovery sites which corresponds to received I/O commands, thereby achieving a significant reduction in the processing delays, storage space, network bandwidth consumption, etc. experienced in response to a disaster event occurring at the primary storage site. This is accomplished, at least in part, because the filesystem at the disaster recovery site is specified as only including metadata stubs which consume only a fraction of the storage space that the actual data corresponding thereto does, e.g., as will be described in further detail below.

In one general embodiment, a computer-implemented method is for restoring operation of a data storage system at a disaster recovery site. The computer-implemented method includes: in response to a disaster event occurring at a primary site, receiving an inode list from a cloud storage site, and receiving configuration information from the cloud storage site. The cloud storage site includes a backup copy of data that is stored at the primary site. Moreover, the inode list and the configuration information are used to construct a filesystem at the disaster recovery site. The filesystem at the disaster recovery site does not include a copy of the data that is stored at the primary site, but rather the filesystem includes a plurality of metadata stubs. The filesystem is further used to satisfy input/output (I/O) commands that are received.

In another general embodiment, a computer program product is for restoring operation of a data storage system at a disaster recovery site. The computer program product includes a computer readable storage medium having program instructions embodied therewith. Moreover, the program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
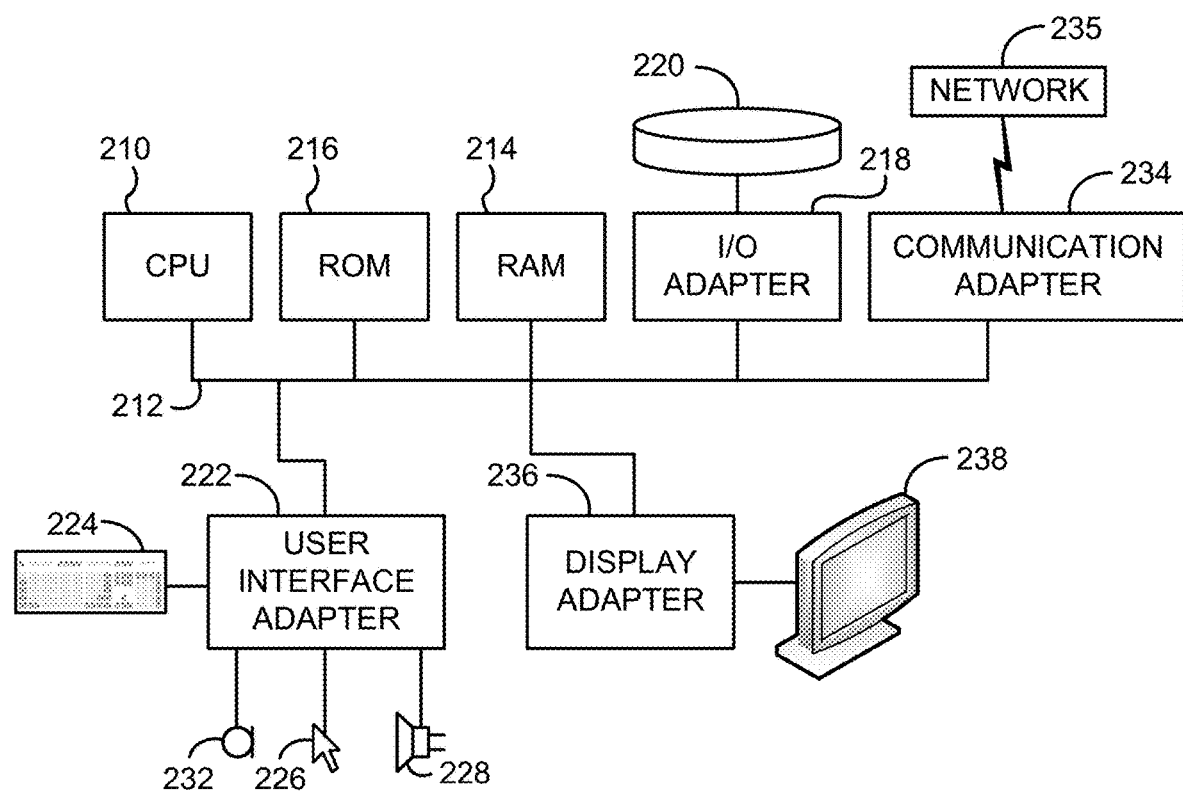
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
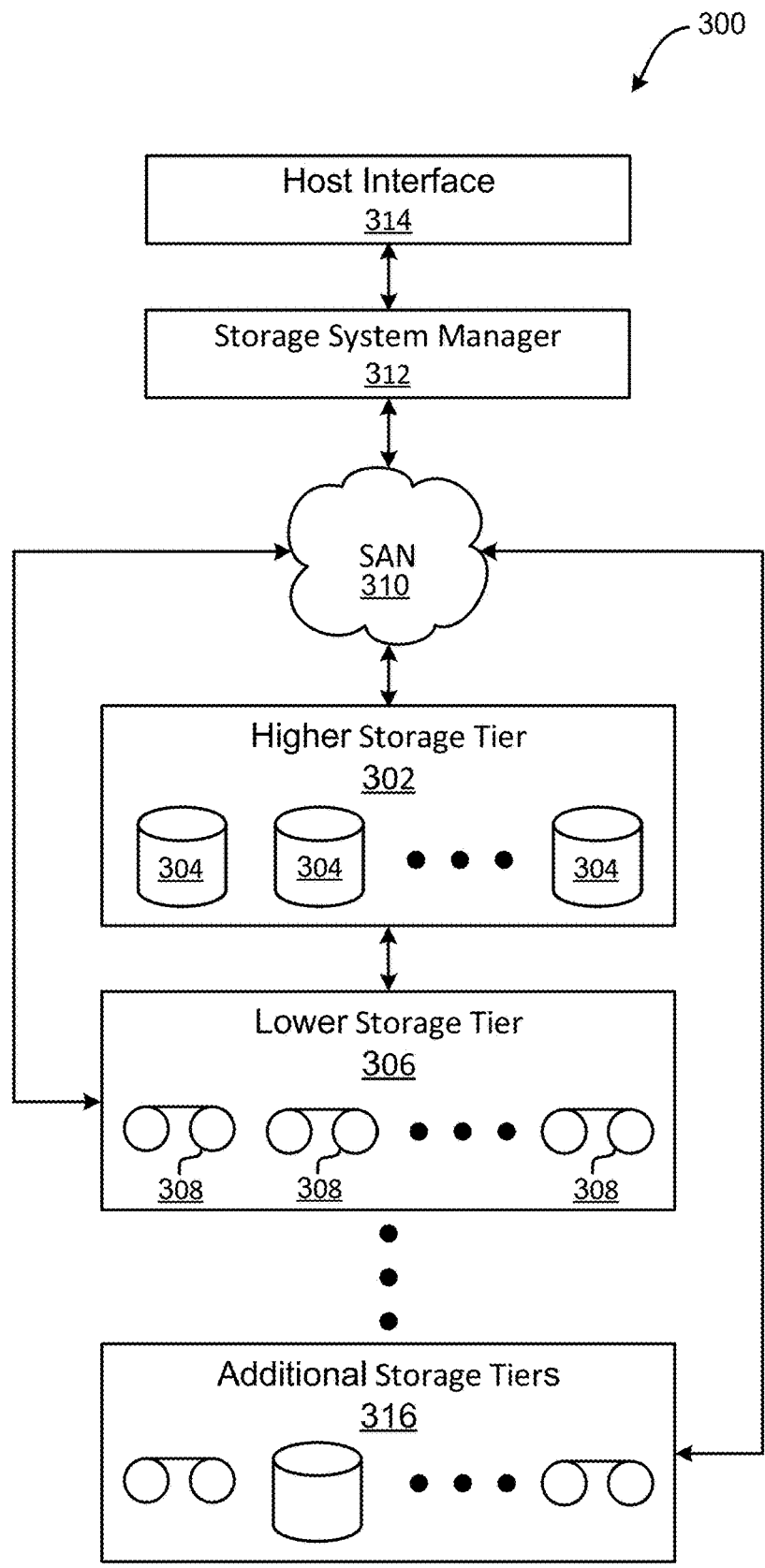
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), non-volatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, the continued growth of data consumption has increased the storage and data accessibility requirements associated with actually maintaining this data. While on premise data storage configurations have had difficulty accommodating these increases in data storage and data accessibility, cloud storage has been able to provide some relief. Again, cloud storage is a model of data storage in which the digital data is stored in logical pools which correspond to physical storage. The physical storage spans multiple servers, and the physical environment is typically managed by a host, e.g., cloud storage provider. These cloud storage providers are responsible for keeping the data available and accessible, and the physical environment protected and running. People and organizations buy or lease storage capacity from the providers to store user, organization, or application data. It follows that cloud storage can be implemented in conjunction with on premise data storage configurations in order to achieve a distributed data storage system.

However, conventional implementations of such data storage systems have also experienced a number of shortcomings. For instance, each location in a data storage system stores a copy of the same data, thereby significantly increasing data storage consumption. Moreover, continually moving data between each of the locations in a data storage system consumes a significant amount of computing resources and network bandwidth.

In sharp contrast to these conventional shortcomings, various ones of the embodiments included herein are able to achieve distributed storage systems which are capable of efficiently recovering from disaster events by reducing data loss as well as processing delays, e.g., as will be described in further detail below.

Figure 4:
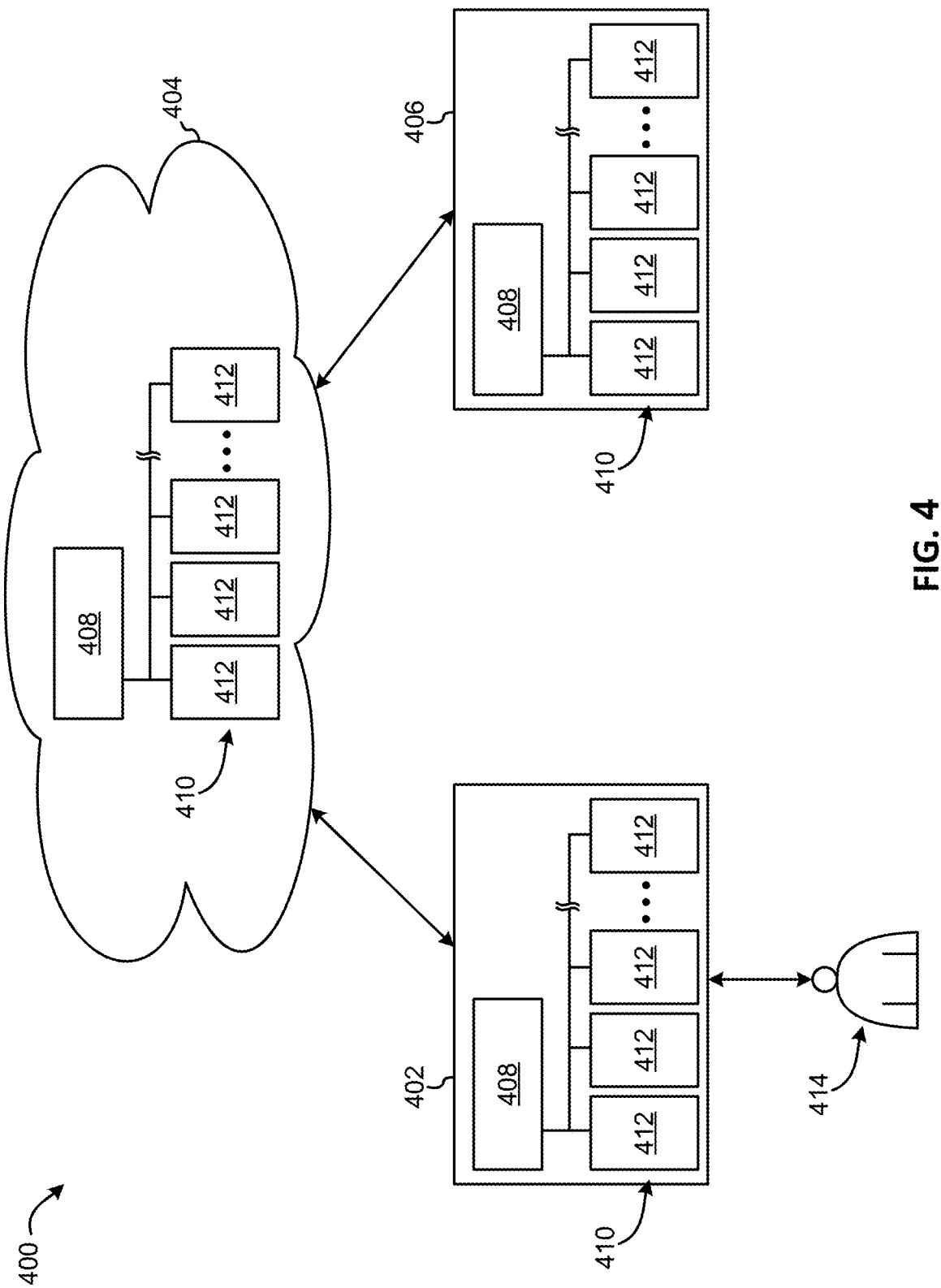
FIG. 4 is a partial representational view of a distributed data storage system in accordance with one embodiment.

FIG. 4 depicts a distributed data storage system 400, in accordance with one embodiment. As an option, the present distributed data storage system 400 may be implemented in conjunction with features from any other embodiment listed herein, such as those described with reference to the other FIGS. However, such distributed data storage system 400 and others presented herein may be used in various applications and/or in permutations which may or may not be specifically described in the illustrative embodiments listed herein. Further, the distributed data storage system 400 presented herein may be used in any desired environment. Thus FIG. 4 (and the other FIGS.) may be deemed to include any possible permutation.

As shown, the distributed data storage system 400 includes a primary site 402 which is coupled to a cloud storage site 404. The cloud storage site 404 is also coupled to a disaster recovery site 406. The cloud storage site 404 may be coupled to each of the primary site 402 and the disaster recovery site 406 using any desired type of communication connection. For instance, in some approaches the cloud storage site 404 is coupled to the primary site 402 and/or the disaster recovery site 406 by a physical connection, e.g., such as a wired connection, a cable, a logical bus, etc. In other approaches, the cloud storage site 404 is coupled to the primary site 402 and/or the disaster recovery site 406 by a wireless connection, e.g., such as a WAN. However, an illustrative list of other network types which may couple the cloud storage site 404 to the primary site 402 and/or the disaster recovery site 406 includes, but is not limited to, a LAN, a PSTN, a SAN, an internal telephone network, etc. Accordingly, the cloud storage site 404 is able to communicate with the primary site 402 and the disaster recovery site 406 regardless of the amount of separation which exists therebetween, e.g., despite being positioned at different geographical locations.

The primary site 402, the cloud storage site 404, and the disaster recovery site 406 each include a controller 408 which is in turn coupled to a data storage array 410. Each of the data storage arrays 410 further include a plurality of data storage components 412, e.g., such as HDDs, SSDs, magnetic tape drives, etc. The data storage components 412 included in a given array 410 may each be the same or different from each other depending on the desired approach. Similarly, data storage components 412 included at each of the sites 402, 404, 406 may be the same or different from each other.

Referring still to FIG. 4, the primary site 402 is also coupled to a user 414. It follows that the primary site 402 is able to receive I/O commands from the user 414 and satisfy them using the controller 408 as well as the data in the data storage components 412. As a result, the controller 408 and data storage array 410 at the primary site 402 are able to maintain a filesystem which includes data that remains accessible to the user 414.

The data that is stored at the primary site 402, along with the metadata associated therewith, is preferably replicated at the cloud storage site 404, thereby forming a secondary copy of the filesystem which exists at the primary site 402. Moreover, as data is added to, modified at, removed from, etc., the primary site 402, these changes are also replicated to the cloud storage site 404. In some approaches, the distributed data storage system 400 implements one or more data storage schemes which are able to provide hybrid cloud storage capability. According to an example, which is in no way intended to limit the invention, the distributed data storage system 400 implements transparent cloud tiering which enables usage of cloud object storage (e.g., public, private, on-premises, etc.) as a secure, reliable, transparent storage tier. Implementing transparent cloud tiering is particularly desirable in some approaches by leveraging existing information lifecycle management policy language semantics, thereby allowing administrators to define policies for tiering data to a cloud object storage.

It follows that the cloud storage site 404 is able to maintain an updated copy of the data stored at the primary site 402 which is insulated from any issues which occur at the primary site 402, e.g., such as a disaster event. For instance, in a multi-site data storage system configuration such as that illustrated in FIG. 4 which includes a primary site 402 and a cloud storage site 404, even if the primary site 402 goes offline, a copy of the data (e.g., files) is still stored at the cloud storage site 404. Further still, data stored at the cloud storage site 404 may be used to establish a secondary filesystem at the disaster recovery site 406 while the primary site 402 remains offline, e.g., as will be described in further detail below.

Figure 5A:
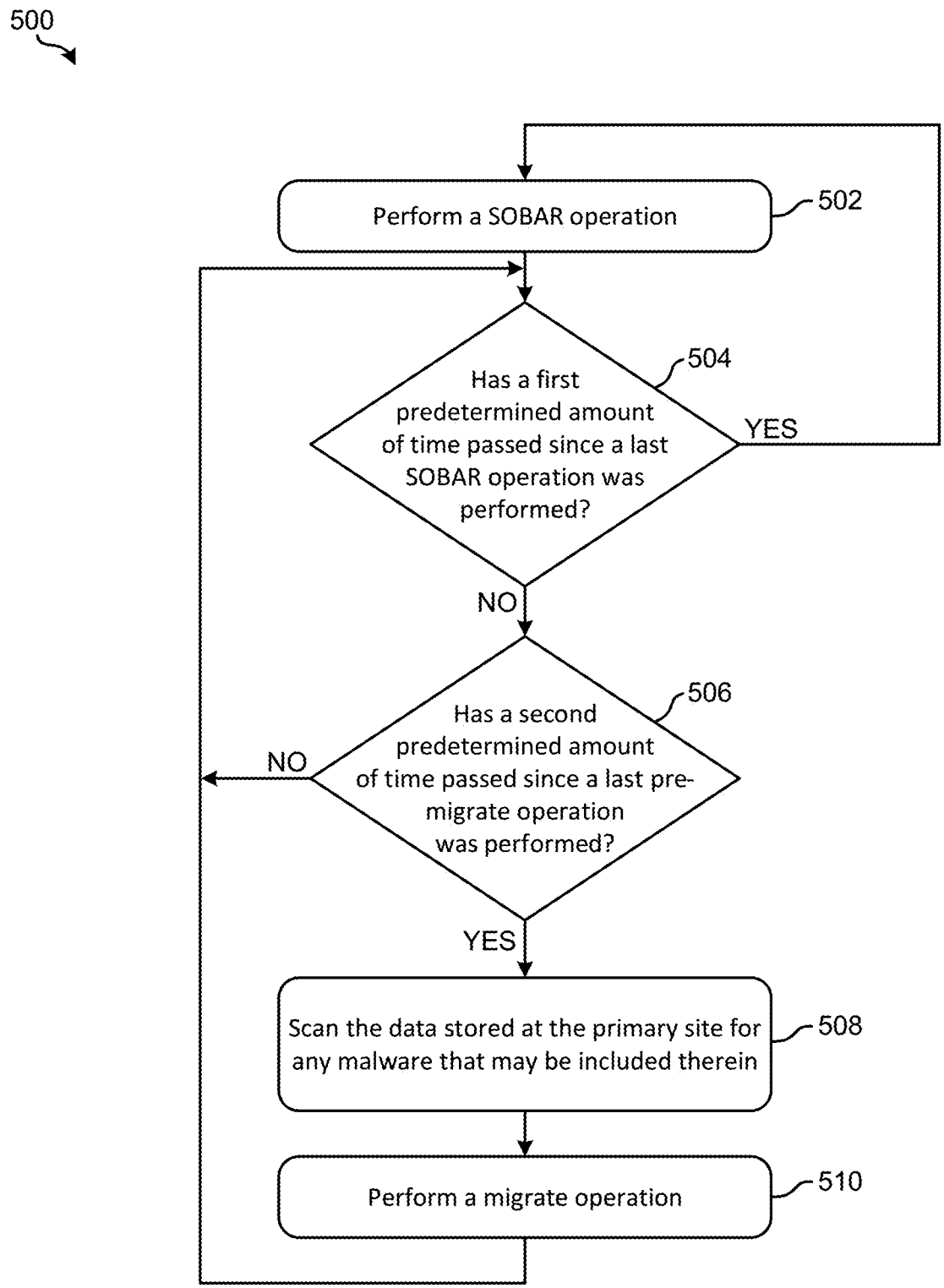
FIG. 5A is a flowchart of a method in accordance with one embodiment.

Replicating the data stored at the primary site 402 to the cloud storage site 404 is an ongoing process performed during normal operation of the distributed data storage system 400. Referring specifically to FIG. 5A, a flowchart of a computer-implemented method 500 for replicating the data stored at a primary site to a cloud storage site is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes initially performing a scale out backup and restore (SOBAR) operation. A SOBAR operation provides a mechanism to backup metadata as well as inode information which corresponds to the specific data (e.g., files) stored at the primary site. Accordingly, the SOBAR operation allows for metadata and inode information corresponding to the data stored at the primary site to be copied to the cloud storage site. Once stored at the cloud storage site, this metadata and inode information may further be restored at another site in response to experiencing a disaster event at the primary site, e.g., as will soon become apparent.

The metadata that is copied to the cloud storage site as a result of performing the SOBAR operation may vary depending on the desired approach. For instance, in some approaches the metadata includes timestamp information which indicates when particular data was created, last modified, read, etc. In other approaches, the metadata includes configuration information which pertains to how data is interrelated, e.g., as would be appreciated by one skilled in the art after reading the present description.

The SOBAR operation is repeated periodically over time, e.g., such that the metadata and inode information is updated on the cloud storage site to accurately reflect any changes that have been made to the data stored at the primary site. Accordingly, decision 504 includes determining whether a first predetermined amount of time has passed since a last SOBAR operation was performed. The first amount of time may be predetermined by a user, a system administrator, industry standards, etc.

In response to determining that the first predetermined amount of time has passed since the last SOBAR operation was performed, method 500 returns to operation 502 such that a subsequent SOBAR operation is performed. However, in response to determining that the first predetermined amount of time has not passed since the last SOBAR operation was performed, method 500 proceeds to decision 506. There, decision 506 includes determining whether a second predetermined amount of time has passed since a last pre-migrate operation was performed.

A migrate operation involves tiering data stored at a first location to a second location. Referring momentarily back to the distributed storage system 400 of FIG. 4, a migrate operation performed on the primary site 402 involves migrating the data (e.g., files) stored at the primary site 402 to the cloud storage site 404. It follows that data which has been migrated from the primary site 402 now remains stored only at cloud storage site 404, in turn achieving storage efficiency. Migrate operations are also preferably performed periodically over time in order to migrate any newly classified data stored at the primary site as it is added to, amended, removed, etc. This second amount of time may also be predetermined by a user, a system administrator, industry standards, etc., depending on the desired approach. Thus, between two full SOBAR backup windows, additional data is being tiered (e.g., migrated) to the cloud storage site 404.

In response to determining that the second predetermined amount of time has not yet passed since a last pre-migrate operation was performed, method 500 returns to decision 504 as shown. It follows that decisions 504 and 506 may be repeated in an iterative fashion until one or both of their respective conditions have been met. However, in response to determining that the second predetermined amount of time has passed since the last pre-migrate operation was performed, method 500 proceeds to operation 508.

There, operation 508 includes scanning the data stored at the primary site for any malware that may be included therein. In other words, operation 508 includes scanning the primary site for any information which is involved with and/or related to obtaining unauthorized access to the primary site. Moreover, the data stored at the primary site is scanned for malware before being moved to the cloud storage site, thereby protecting the cloud storage site, and the overarching storage system itself, from cyberattacks.

In some approaches, operation 508 may be performed by scanning the data for specific data sequences which are consistent with known types of malware. However, it should be noted that malware may be identified using any type of scanning procedure which would be apparent to one skilled in the art after reading the present description. In preferred approaches, the scan performed in operation 508 is able to keep track of what data has already been examined. In other words, an initial scan may involve inspecting all data stored at the primary site, while subsequent scans only involve inspecting data which has been introduced and/or modified since the last malware scan was performed. This desirably reduces processing delays and system bandwidth consumption while maintaining robust protection against cyberattacks at the primary site as well as the cloud storage site.

Method 500 further includes performing a migrate operation. See operation 510. As mentioned above, a migrate operation involves moving the data stored at a first location (e.g., primary site) to a second location (e.g., cloud storage site). This data movement results in zero-byte file stubs being left at the primary site, each stub corresponding to a respective portion of the migrated data. The migrated data itself resides at a cloud storage site, thereby removing the desire of maintaining two copies of data. High availability and redundancy of a cloud storage site (e.g., see 404 above) is also leveraged in some approaches to further protect the data.

From operation 510, method 500 returns to decision 504, whereby another determination may be made as to whether the first predetermined amount of time has passed since the last SOBAR operation was performed. As alluded to above, various ones of the processes included in method 500 are repeated in an iterative process during nominal operation of the corresponding distributed data storage system.

Figure 5B:
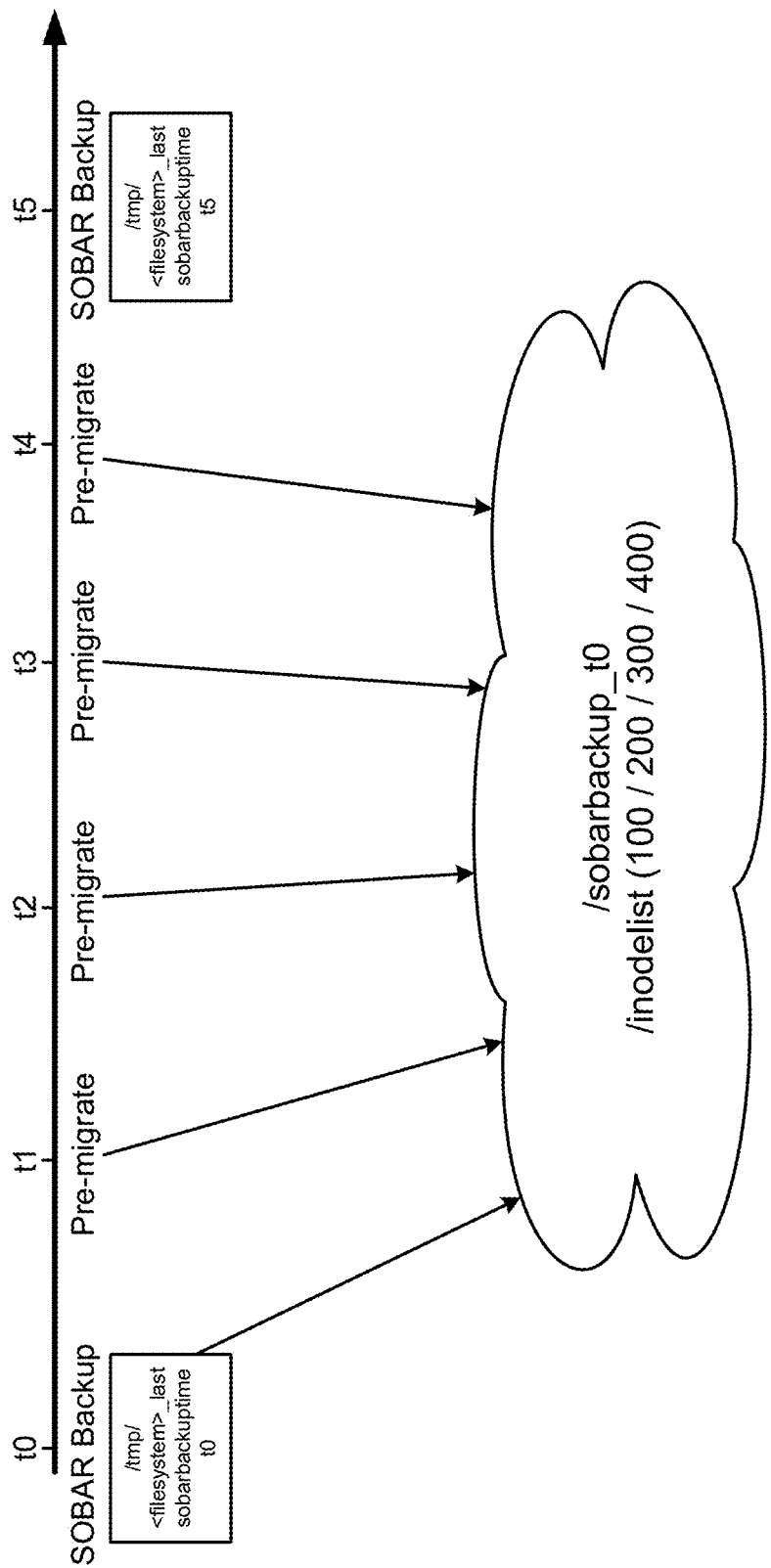
FIG. 5B is an illustrative progression of a method in accordance with one embodiment.

Referring momentarily now to FIG. 5B, an illustrative progression of backing up (e.g., tiering) the data at a primary site to a cloud storage site is depicted in accordance with an in-use example, which is in no way intended to limit the invention. As shown, the progression begins with a SOBAR operation which is performed at t0. As mentioned above, the SOBAR operation involves the inode information as well as metadata (e.g., configuration information) which corresponds to the data stored at the primary site. Moreover, the inode information and metadata are sent directly to the cloud storage site, and not the disaster recovery site. Compared to the data storage footprint of actual data, the storage capacity consumed by this inode information and other metadata is significantly smaller.

A second SOBAR operation is also in the process of being performed at t5, and therefore has not yet been uploaded to the cloud storage site. Between the SOBAR operations, a number of migrate operations are also performed. As mentioned above, the data at the primary site is preferably scanned prior to actually performing each of the migrate operations. According to an exemplary approach, a watcher program triggers the performance of a "local_threat_scan" program which scans the managed filesystem as well as the resident files to determine if any malware exists therein.

Thereafter, the watcher program actually initiates migration of the files to the cloud storage site. As a result, each of the migrate operations are performed such that whenever a new file is created or modified in the filesystem, the watcher program ensures that none of the data sent to the cloud storage site is infected by one or more software viruses. This also desirably ensures that the files which are migrated to the cloud storage site are resilient against cyberattacks, in turn the cloud storage site (e.g., see 404 above) acts as an air-gap, or cyber resilient site. It should be noted that in some approaches, the watcher program is a daemon which monitors the data creation and/or modification, while also assisting with the migrate operations. Accordingly, whenever files are created, removed, modified, etc., the same operations are replicated on the copy at the cloud storage site. In some approaches, the watcher program is performed on cluster nodes. Moreover, the restore of primary site nodes can occur across different clustered filesystem configurations and a pre-load of the respective image is maintained in place for restoring nodes at the disaster recovery site, e.g., as would be appreciated by one skilled in the art after reading the present description.

In response to the watcher program completing the migrate operation, a journal backup to the cloud storage site is executed. As a result, if any data is migrated to cloud between two backup process using higher cut-fast thread frequency, transparent cloud tiering may be used to push journal chunks quickly to the cloud storage site, e.g., as would be appreciated by one skilled in the art after reading the present description. This also desirably reduces the backup window, thereby reducing the chance of experiencing a backlog, and increasing RPO (recovery point objective). According to an example, which is in no way intended to limit the invention, a migrate operation performed at t1 results in 100 files being migrated between t0 and t1. Accordingly, a disaster which occurs between t1 and t2 while a next 100 files are being pre-migrated will desirably not affect the data which was pre-migrated between t0 and t1.

It follows that during nominal operation of a distributed data storage system (e.g., see FIG. 4), the various processes in method 500 are able to achieve an accurate backup of the primary site. This SOBAR backup mainly consists of inode information and metadata of all the files in the filesystem. With this information, only a single copy of data, inode information, metadata plus delta inode information between time t0 and t1 is now available at the cloud storage site. Moreover, this backup copy of the primary site is stored in a cloud storage site, which is particularly desirable because cloud storage provides a much more easily scalable data storage platform, e.g., in comparison to the disaster recovery site. Accordingly, the disaster recovery site remains idle while the primary site and the cloud storage site are operating nominally. However, it should be noted that the disaster recovery site is in no way required to remain completely idle. For instance, the disaster recovery site may be utilized to provide additional computing power during periods of high latency.

Although method 500 is able to achieve an accurate backup of the primary site during normal operating conditions, the primary site may experience a disaster situation such as a power outage, a natural disaster, an unintentional shutdown, etc. Although the cloud storage site contains a copy of the data stored at the primary site prior to it going offline, it is not practical to shift operational control of the overarching data storage system to the cloud storage site. Rather, it is preferred that the disaster recovery site assume operational control of the data storage system, at least while the primary site remains offline.

Figure 6A:
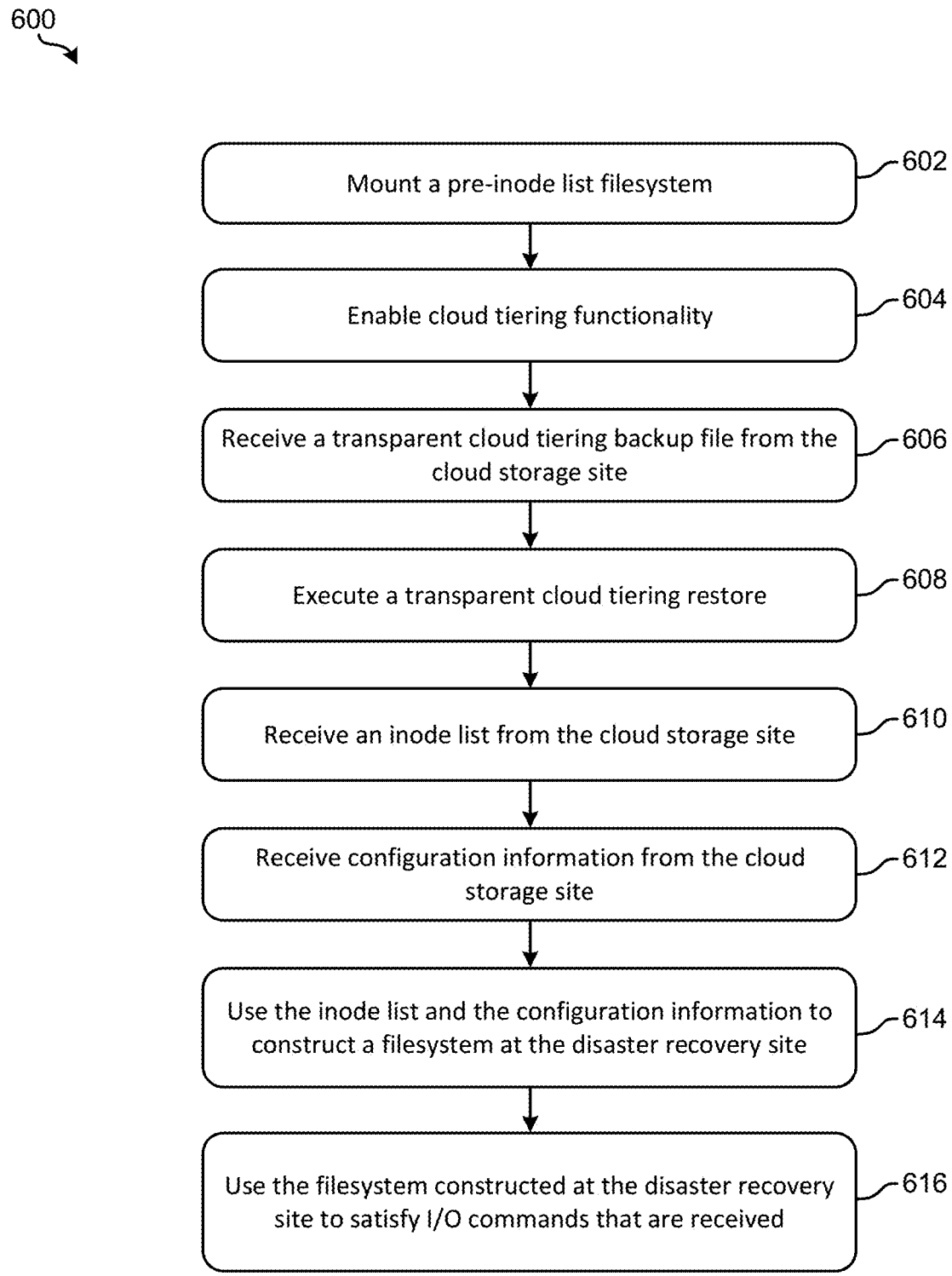
FIG. 6A is a flowchart of a method in accordance with one embodiment.

As mentioned above, the disaster recovery site remains idle while the primary site is operational, and therefore the disaster recovery site does not accurately reflect the filesystems at the primary site. The act of transferring all the information and data from the cloud storage site to the disaster recovery site may thereby seem like a logical step towards making the data storage system operational again, but the monetary, computing, temporal, etc., costs associated with doing so are severe. Rather, FIG. 6A illustrates a flowchart of a computer-implemented method 600 for bringing a disaster recovery site online, according to one embodiment. The method 600 may be performed in accordance with the present invention in any of the environments depicted in FIGS. 1-5B, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, operation 602 of method 600 includes mounting a pre-inode list filesystem. Again, the disaster recovery site remains idle during nominal operation of the overarching distributed data storage system, and therefore a general filesystem is first mounted. The pre-inode list filesystem may be mounted in read only mode in some approaches, while in other approaches the filesystem may also or alternatively support writes.

Operation 604 further includes enabling cloud tiering functionality. In some approaches, the cloud tiering functionality is enabled by installing packages which correspond thereto, e.g., as would be appreciated by one skilled in the art after reading the present description. For example, a package containing a Spectrum Scale filesystem edition which supports cloud tiering functionality may be selectively installed, e.g., by a user.

Moreover, operation 606 includes receiving a transparent cloud tiering backup file from the cloud storage site. The transparent cloud tiering backup file which is received is often a copy of a file which exists at the cloud storage site. However, because the transparent cloud tiering backup file is typically a small file, the copy of this files is formed in a desirably small amount of time (e.g., within a few minutes). It should also be noted that a transparent cloud tiering backup file is in no way intended to limit the invention. Rather, in other approaches a different type of file or packet of information may be received in operation 606, e.g., as would be appreciated by one skilled in the art after reading the present description.

Network shared disks are also pre-created at the disaster recovery site for the filesystem in some approaches. In such approaches, the network shared disks may be pre-created using any procedures which would be apparent to one skilled in the art after reading the present description. Moreover, the network shared disks preferably match in number and configuration as those included at the primary site in order to achieve a successful restore at the disaster recovery site.

Operation 608 includes executing a transparent cloud tiering restore. In preferred approaches, the transparent cloud tiering restore is executed by specifying a particular access point at the cloud storage site. In doing so, the disaster recovery site is able to communicate directly with the cloud storage site and receive specific data, inode information, metadata, etc. therefrom, e.g., as will soon become apparent.

Once the transparent cloud tiering restore has been performed, the operational relationship previously shared between the primary site and the cloud storage site is restored between the disaster recovery site and the cloud storage site. In some approaches, a corresponding sharing container is only presented in an "ONLINE" state, thereby allowing an administrator to download desired data (e.g., files) from the cloud storage site. It is preferred that the disaster recovery site implements a same number of cloud storage access point IPs as were implemented at the primary site. However, a different number of cloud storage access point IPs may be implemented in some approaches. In such approaches, it should be noted that while the number of cloud storage access point IPs for the disaster recovery site is different than implemented by the primary site, the number of cloud storage access point uniform resource locators (URLs) used preferably matches the number of cloud storage access point URLs used at the primary site. However, in situations where fewer cloud storage access point URLs are implemented at the disaster recovery site than the primary site, one or more of the URL and IP combinations may be repeated, e.g., as would be appreciated by one skilled in the art after reading the present description.

As mentioned above, the various processes included in method 600 are performed in response to the primary site going offline (e.g., experiencing a disaster event). Accordingly, the cloud storage site's backup copy of the data that is stored at the primary site may be utilized to bring the disaster recovery site online. Referring still to FIG. 6A, operation 610 includes receiving an inode list from the cloud storage site, while operation 612 includes receiving configuration information from the cloud storage site. The inode list and/or the configuration information are received from the access point specified as a part of executing the transparent cloud tiering restore in operation 608 above. Again, by specifying a particular access point at the cloud storage site, the disaster recovery site is able to communicate directly with the cloud storage site and receive specific data, inode information, metadata, etc. therefrom.

The inode list and the configuration information are further used to construct a filesystem at the disaster recovery site. See operation 614. However, it should be noted that the filesystem constructed at the disaster recovery site does not include an actual copy of the data that is stored at the cloud storage site. In other words, data is not automatically copied from the cloud storage site to the filesystem created at the disaster recovery site. Rather, the filesystem created at the disaster recovery site includes a plurality of metadata stubs. Each of these metadata stubs corresponds to a specific portion of data (e.g., file) which is stored at the primary site as well as the cloud storage site. The actual information included in each of the metadata stubs may vary depending on the desired approach. For instance, in various approaches each of the metadata stubs may include the name, logical block address, physical block address, total size (e.g., number of bytes), etc., of the file (or portion of a file) which corresponds thereto. It follows that the metadata stubs themselves consume only a fraction of the storage space that the actual data corresponding thereto does. Accordingly, the filesystem constructed in operation 614 significantly improves storage space utilization at the disaster recovery site.

In some approaches, the inode list and the configuration information are used to construct a filesystem at the disaster recovery site by performing a SOBAR operation. Accordingly, operation 614 may include downloading a SOBAR configuration backup and/or an inode backup from the cloud storage site. Accordingly, a SOBAR restore operation may be executed for each of the filesystems that are restored at the disaster recovery site. However, additional filesystem related commands are not repeated at the disaster recovery site, as only metadata stubs have been restored in preferred approaches.

Moreover, while performing a SOBAR restore operation, a priority index process scans through the journal and metadata in some approaches to determine which metadata should be restored on the priority basis. A file curation operation is also triggered in some approaches which converts co-resident files into non-resident when restored at the disaster recovery site. In other words, operation 614 actually includes examining each entry in the inode list at the disaster recovery site, and converting co-resident entries to non-resident entries. With respect to the present description, "co-resident entries" represent data (e.g., files) that have been migrated from the given filesystem to the cloud storage site, but which also remain available on the given filesystem as well. Moreover, "non-resident entries" represent data (e.g., files) that have been migrated from a given filesystem to the cloud storage site, while only a metadata stub remains on the given filesystem. It follows that some of the entries in the inode list are non-resident where only one copy of data is available on cloud storage site. Some of the entries in the inode list at the primary site are co-resident entries and all of the data at the primary site is copied to the cloud storage site for such co-resident entries. Moreover, each of the entries in the inode list which corresponds to the disaster recovery site are non-resident entries. This is because while the cloud storage site contains an actual copy of the data that is stored at the offline primary site, the disaster recovery site only includes metadata stubs, each of which correspond to a specific portion of the data at the cloud storage site.

Figure 6B:
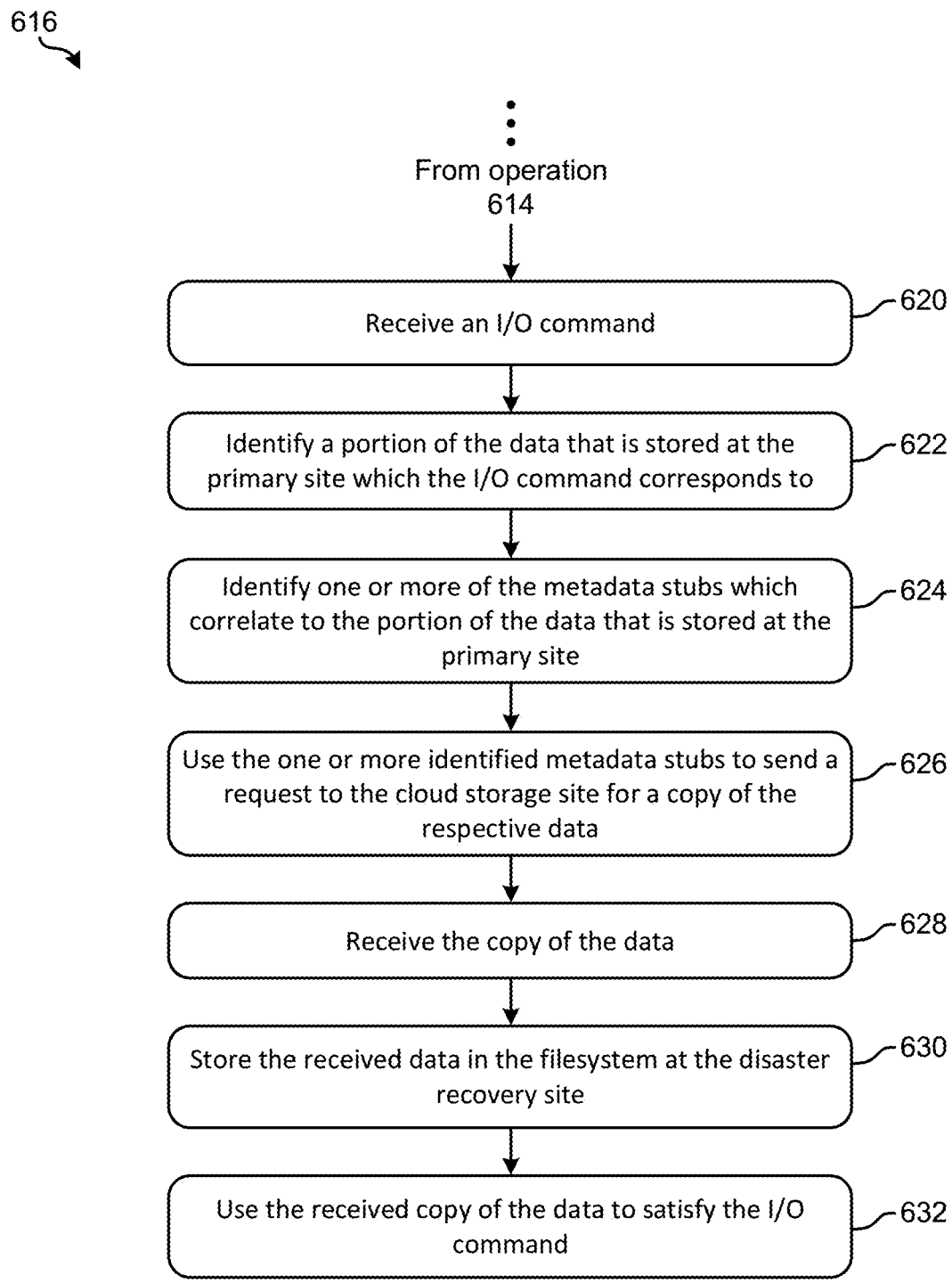
FIG. 6B is a flowchart of sub-processes for one of the operations in the method of FIG. 6A, in accordance with one embodiment.

The filesystem constructed at the disaster recovery site is thereby used to satisfy I/O commands that are received. See operation 616. Specifically, the metadata stubs in the filesystem constructed at the disaster recovery site are used in combination with the data copies stored at the cloud storage site to satisfy I/O commands that are received, e.g., from a user communicating with the primary site prior to it going offline. Looking to FIG. 6B, exemplary sub-processes of using the filesystem constructed at the disaster recovery site to satisfy received I/O commands are illustrated in accordance with one embodiment, one or more of which may be used to perform operation 616 of FIG. 6A. However, it should be noted that the sub-processes of FIG. 6B are illustrated in accordance with one embodiment which is in no way intended to limit the invention.

As shown, the flowchart includes actually receiving an I/O command. See sub-operation 620. The I/O command that is received may vary depending on the approach. For instance, the I/O command may be a read command, a write command, a read-modify command, etc. Moreover, sub-operation 622 includes identifying a portion of the data that is stored at the primary site which the I/O command corresponds to. An I/O command typically identifies the specific data (e.g., file or portion thereof) which is involved. Thus, the information provided in the I/O itself may be used in some approaches to identify the specific portion of data in sub-operation 622. In other approaches, sub-operation 622 involves examining the inode list at the disaster recovery site in order to identify a specific portion of the data which the I/O command corresponds to.

Sub-operation 624 further includes identifying one or more of the metadata stubs which correlate to the portion of the data that is stored at the primary site. In other words, sub-operation 624 includes identifying one or more of the metadata stubs at the disaster recovery site which correlate to the portion of the data (e.g., file) identified in the received I/O command. Once the one or more metadata stubs at the disaster recovery site have been identified, sub-operation 626 includes using the one or more identified metadata stubs to send a request to the cloud storage site for a copy of the respective data.

The copy of the data stored at the primary site is received in sub-operation 628 from the cloud storage site in response to the request sent in sub-operation 626. Moreover, sub-operation 630 includes storing the received data in the filesystem at the disaster recovery site. In other words, the data received from the cloud storage site actually replaces the metadata stubs at the disaster recovery site which correspond thereto. Furthermore, sub-operation 632 includes actually using the received copy of the data to satisfy the I/O command.

By only copying the data which corresponds to received I/O commands, various ones of the embodiments included herein are able to achieve a significant reduction in the processing delays, storage space, network bandwidth consumption, etc. experienced in response to a disaster event occurring at the primary storage site. This is achieved, at least in part, because the metadata stubs at the disaster recovery site consume only a fraction of the storage space that the actual data corresponding thereto does. Accordingly, the filesystem constructed at the disaster recovery site significantly improves storage space utilization, and even allows for the disaster recovery site to be scaled accordingly, thereby reducing operating costs.

Moreover, communication bandwidths between the different sites in the distributed data storage system are not excessively taxed as inode lists and configuration information are small in size. Additionally, only data which specifically corresponds to received I/O commands is transferred between the cloud storage site and the disaster recovery site, thereby further reducing network traffic and operating expenses while also avoiding network degradation and related performance issues. The data that is copied from the cloud storage site to the disaster recovery site while the primary site remains offline is maintained at the disaster recovery site in some approaches, e.g., such that it remains available at the disaster recovery site for any subsequent I/O commands which correspond thereto.

A primary site which has gone offline, e.g., in response to experiencing a disaster event, may eventually be brought back online. In some approaches, the operational control of the data storage system may be returned to the primary site in response to it coming back online by replicating any data modifications which were performed at the disaster recovery site while the primary site was offline. However, in other approaches the disaster recovery site may retain operational control of the data storage system until system throughput falls below a predetermined threshold, a predetermined amount of time has passed, computing and/or network bandwidth consumption rises above a predetermined threshold, etc.

It should also be noted that although various ones of the embodiments included herein are described in the context of a distributed data storage system which includes a primary site, a cloud storage site, and a disaster recovery site (e.g., as shown in FIG. 4 above), this is in no way intended to limit the invention. Rather, any of the approaches described herein may be implemented similarly in a distributed data storage system which includes any number of data storage sites.

According to an in-use example, which is in no way intended to limit the invention, a customer has four data storage sites which are divided into Cluster 1 which includes Primary Site 1 and Primary Site 2, and Cluster 2 which includes Disaster Recovery Site 3 and Disaster Recovery Site 4. Additionally, a Cloud Storage Site is coupled to each of the clusters. The distance between Cluster 1 and Cluster 2 is more than 700 kilometers. Additionally, Primary Site 1 and Primary Site 2 include "n" different filesystems which are to be protected from data loss. The Cloud Storage Site accessor node connected to Cluster 1 is different from the Cloud Storage Site accessor node that is connected to Cluster 2. Accordingly, accessors 1-4 are enabled at Primary Site 1 and accessors 4-8 are disabled at Disaster Recovery Site 3 while the disaster recovery sites at Cluster 2 remain idle during nominal operation. However, in response to the primary sites going offline at Cluster 1 (e.g., in response to a disaster event occurring), accessors 4-8 at Disaster Recovery Site 3 are preferably enabled and used to restore the metadata on the disaster recovery site from the cloud storage site using any of the approaches included herein. Accordingly, only metadata stubs will be present on the filesystem at the disaster recovery sites. However, when each of these stubs are accessed in response to receiving an I/O command, the data which corresponds thereto is transparently recalled from the cloud storage site.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
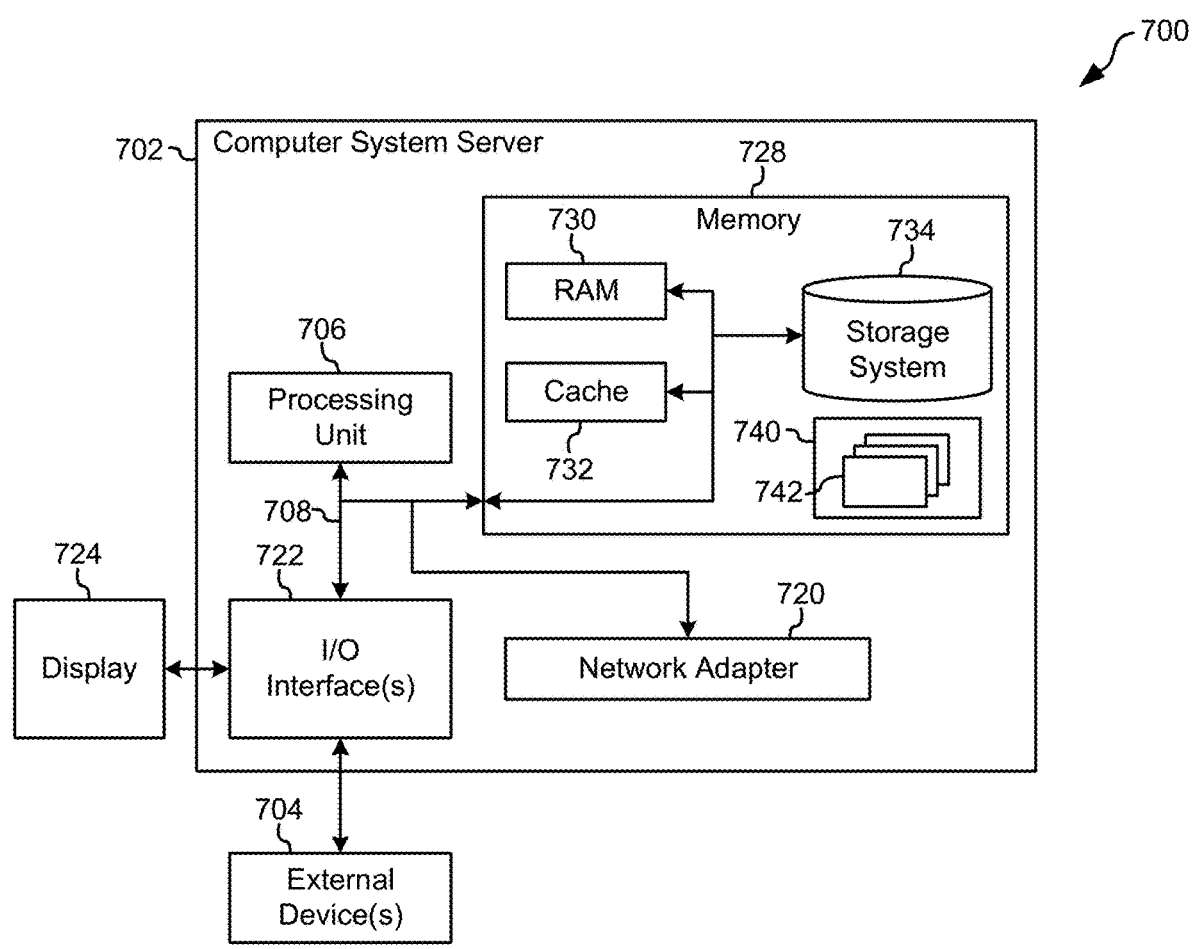
FIG. 7 is a representational view of a cloud computing node in accordance with one embodiment.

Referring now to FIG. 7, a schematic of an example of a cloud computing node is shown. Cloud computing node 700 is only one example of a suitable cloud computing node and is not intended to suggest any limitation as to the scope of use or functionality of embodiments of the invention described herein. Regardless, cloud computing node 700 is capable of being implemented and/or performing any of the functionality set forth hereinabove.

In cloud computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 706, a system memory 728, and a bus 708 that couples various system components including system memory 728 to processor 706.

Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 728 can include computer system readable media in the form of volatile memory, such as random access memory (RAM) 730 and/or cache memory 732. Computer system/server 702 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 702 may also communicate with one or more external devices 704 such as a keyboard, a pointing device, a display 724, etc.; one or more devices that enable a user to interact with computer system/server 702; and/or any devices (e.g., network card, modem, etc.) that enable computer system/server 702 to communicate with one or more other computing devices. Such communication can occur via I/O interfaces 722. Still yet, computer system/server 702 can communicate with one or more networks such as a local area network (LAN), a general wide area network (WAN), and/or a public network (e.g., the Internet) via network adapter 720. As depicted, network adapter 720 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Figure 8:
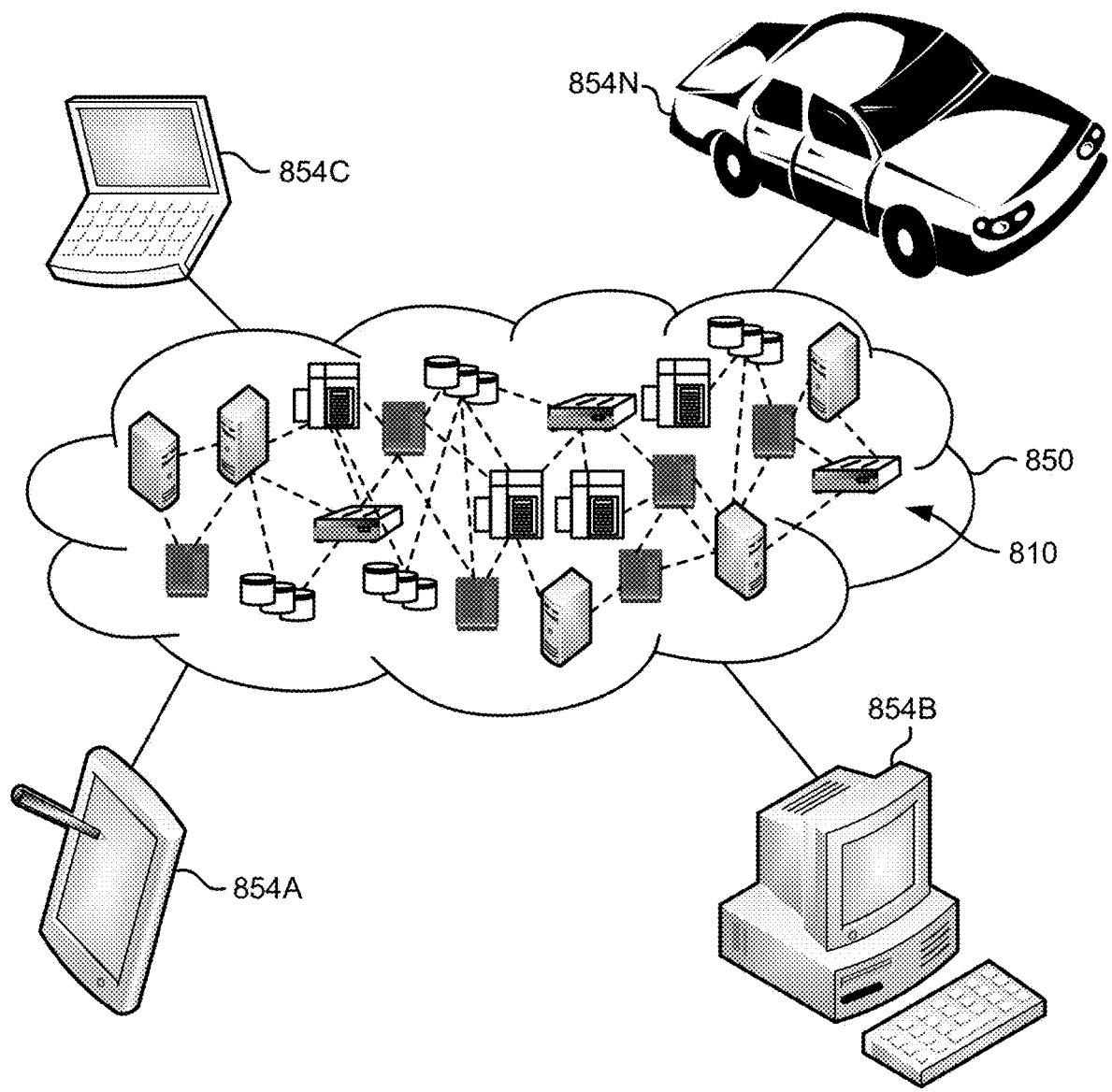
FIG. 8 is a representational view of a cloud computing environment in accordance with one embodiment.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-854N shown in FIG. 8 are intended to be illustrative only and that computing nodes 810 and cloud computing environment 850 can communicate with any type of computerized device over any type of network and/or network addressable connection (e.g., using a web browser).

Figure 9:
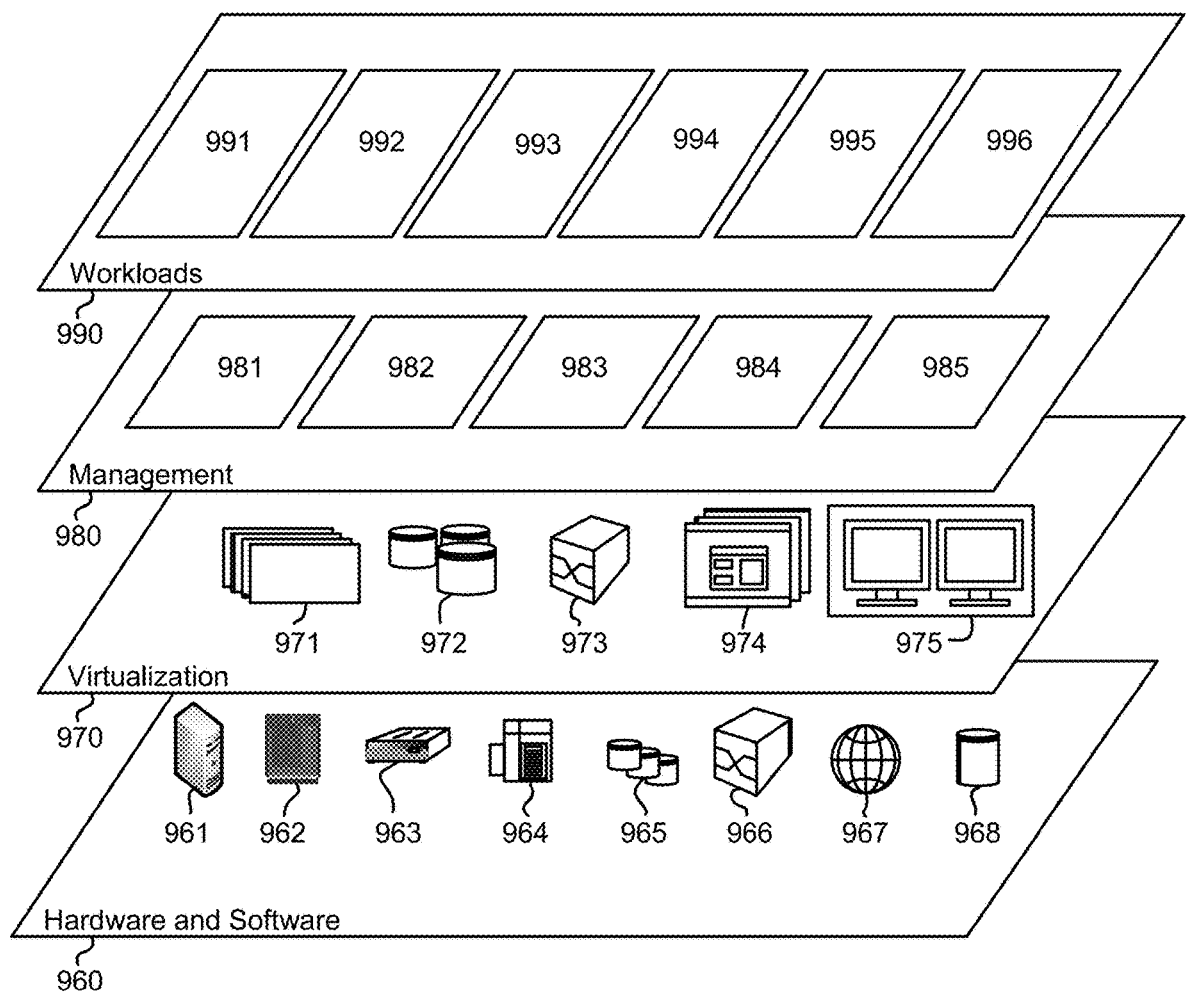
FIG. 9 is a representational view of abstraction model layers in accordance with one embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and restoring operation of a data storage system at an idol disaster recovery site using inode lists and configuration information 996.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for restoring operation of a data storage system at a disaster recovery site, comprising:
    in response to a disaster event occurring at a primary site, receiving an inode list from a cloud storage site, wherein the cloud storage site includes a backup copy of data that is stored at the primary site;
    receiving configuration information from the cloud storage site;
    using the inode list and the configuration information to construct a filesystem at the disaster recovery site, wherein the filesystem at the disaster recovery site does not include a copy of the data that is stored at the primary site, wherein the filesystem includes a plurality of metadata stubs,
    wherein using the inode list and the configuration information to construct the filesystem at the disaster recovery site includes: performing a scale out backup and restore operation,
    wherein the scale out backup and restore operation includes causing a priority index process to scan a journal of the cloud storage site and metadata to determine which of the metadata to restore on a priority basis;
    restoring the determined metadata according to the priority basis; and
    using the filesystem to satisfy input/output (I/O) commands that are received.

2. The computer-implemented method of claim 1, wherein using the filesystem to satisfy I/O commands that are received includes:
    receiving an I/O command;
    identifying a portion of the data that is stored at the primary site which the I/O command corresponds to;
    identifying one or more of the metadata stubs which correlate to the portion of the data that is stored at the primary site;

using the one or more identified metadata stubs to send a request to the cloud storage site for a copy of the portion of the data that is stored at the primary site;
receiving the copy of the portion of the data that is stored at the primary site; and
using the received copy of the portion of the data that is stored at the primary site to satisfy the I/O command.

3. The computer-implemented method of claim 1, wherein the backup copy of the data that is stored at the primary site is scanned for malware before being stored at the cloud storage site.

4. The computer-implemented method of claim 1, comprising:
examining each entry in the inode list; and
converting co-resident entries to non-resident entries.

5. The computer-implemented method of claim 1, comprising:
mounting a pre-inode list filesystem;
installing packages to enable cloud tiering functionality, wherein the packages supports cloud tiering functionality;
receiving a transparent cloud tiering backup file from the cloud storage site; and
executing a transparent cloud tiering restore by specifying an access point at the cloud storage site,
wherein the inode list and the configuration information are received from the specified access point.

6. The computer-implemented method of claim 5, wherein the pre-inode list filesystem is mounted in read and write mode, wherein the disaster recovery site implements a different number of cloud storage access point internet protocols (IPs) than implemented at the primary site, wherein the disaster recovery site implements fewer cloud storage access point uniform resource locators (URLs) than implemented at the primary site, wherein at least some URL and IP combinations are repeated at the disaster recovery site based on the different number of cloud storage access point IPs and the different number of cloud storage access point URLs.

7. The computer-implemented method of claim 1, wherein the disaster recovery site remains idle while the primary site is operational, wherein performing the scale out backup and restore operation includes triggering a curation operation that converts co-resident entries of the data into non-resident entries of the data stored on the cloud storage site.

8. A computer program product for restoring operation of a data storage system at a disaster recovery site, the computer program product comprising a computer readable storage medium having program instructions embodied therewith, the program instructions readable and/or executable by a processor to cause the processor to:
in response to a disaster event occurring at a primary site, receive, by the processor, an inode list from a cloud storage site, wherein the cloud storage site includes a backup copy of data that is stored at the primary site;
receive, by the processor, configuration information from the cloud storage site;
use, by the processor, the inode list and the configuration information to construct a filesystem at the disaster recovery site,
wherein the filesystem at the disaster recovery site does not include a copy of the data that is stored at the primary site, wherein the filesystem includes a plurality of metadata stubs,
wherein using the mode list and the configuration information to construct the filesystem at the disaster recovery site includes: performing a scale out backup and restore operation,
wherein the scale out backup and restore operation includes causing a priority index process to scan a journal of the cloud storage site and metadata to determine which of the metadata to restore on a priority basis;
restore, by the processor, the determined metadata according to the priority basis; and
use, by the processor, the filesystem to satisfy input/output (I/O) commands that are received.

9. The computer program product of claim 8, wherein using the filesystem to satisfy I/O commands that are received includes:
receiving an I/O command;
identifying a portion of the data that is stored at the primary site which the I/O command corresponds to;
identifying one or more of the metadata stubs which correlate to the portion of the data that is stored at the primary site;
using the one or more identified metadata stubs to send a request to the cloud storage site for a copy of the portion of the data that is stored at the primary site;
receiving the copy of the portion of the data that is stored at the primary site; and
using the received copy of the portion of the data that is stored at the primary site to satisfy the I/O command.

10. The computer program product of claim 8, wherein the backup copy of the data that is stored at the primary site is scanned for malware before being stored at the cloud storage site.

11. The computer program product of claim 8, the program instructions readable and/or executable by the processor to cause the processor to:
examine, by the processor, each entry in the inode list; and
convert, by the processor, co-resident entries to non-resident entries.

12. The computer program product of claim 8, the program instructions readable and/or executable by the processor to cause the processor to:
mount, by the processor, a pre-inode list filesystem;
enable, by the processor, cloud tiering functionality;
receive, by the processor, a transparent cloud tiering backup file from the cloud storage site; and
execute, by the processor, a transparent cloud tiering restore by specifying an access point at the cloud storage site,
wherein the disaster recovery site implements a different number of cloud storage access point internet protocols (IPs) as were implemented at the primary site,
wherein the disaster recovery site implements a same number of cloud storage access point uniform resource locators (URLs) as were implemented at the primary site,
wherein the inode list and the configuration information are received from the specified access point.

13. The computer program product of claim 12, wherein the pre-inode list filesystem is mounted in read only mode.

14. The computer program product of claim 8, wherein the disaster recovery site remains idle while the primary site is operational except during periods of relatively high latency within a distributed data storage system that includes the primary site, the cloud storage site and the disaster recovery site.

15. A system, comprising:

a hardware processor; and logic integrated with the hardware processor, executable by the hardware processor, or integrated with and executable by the hardware processor, the logic being configured to:

in response to a disaster event occurring at a primary site, receive, by the hardware processor, an inode list from a cloud storage site, wherein the cloud storage site includes a backup copy of data that is stored at the primary site;

receive, by the hardware processor, configuration information from the cloud storage site;

use, by the hardware processor, the inode list and the configuration information to construct a filesystem at a disaster recovery site, wherein the filesystem at the disaster recovery site does not include a copy of the data that is stored at the primary site, wherein the filesystem includes a plurality of metadata stubs, wherein using the inode list and the configuration information to construct the filesystem at the disaster recovery site includes: performing a scale out backup and restore operation;

restore, by the hardware processor, metadata determined from the scale out backup and restore operation, wherein the determined metadata is restored according to a priority basis; and use, by the hardware processor, the filesystem to satisfy input/output (I/O) commands that are received.

16. The system of claim 15, wherein using the filesystem to satisfy I/O commands that are received includes:

receiving an I/O command;

identifying a portion of the data that is stored at the primary site which the I/O command corresponds to;

identifying one or more of the metadata stubs which correlate to the portion of the data that is stored at the primary site;

using the one or more identified metadata stubs to send a request to the cloud storage site for a copy of the portion of the data that is stored at the primary site;

receiving the copy of the portion of the data that is stored at the primary site; and using the received copy of the portion of the data that is stored at the primary site to satisfy the I/O command.

17. The system of claim 15, wherein the backup copy of the data that is stored at the primary site is scanned for malware before being stored at the cloud storage site.

18. The system of claim 15, the logic being configured to:

examine, by the hardware processor, each entry in the inode list; and convert, by the hardware processor, co-resident entries to non-resident entries.

19. The system of claim 15, the logic being configured to:

mount, by the hardware processor, a pre-inode list filesystem;

install, by the hardware processor, packages to enable cloud tiering functionality;

receive, by the hardware processor, a transparent cloud tiering backup file from the cloud storage site;

pre-creating network shared disks at the disaster recovery site for constructing the filesystem at the disaster recovery site, wherein the network shared disks match in number and configuration to disks included at the primary site; and execute, by the hardware processor, a transparent cloud tiering restore by specifying an access point at the cloud storage site, wherein the disaster recovery site implements a same number of cloud storage access point internet protocols (IPs) as were implemented at the primary site, wherein the inode list and the configuration information are received from the specified access point, wherein the pre-inode list filesystem is mounted in read and write mode, wherein the scale out backup and restore operation includes causing a priority index process to scan a journal of the cloud storage site and metadata, wherein the determined metadata is determined based on the scan.

20. The system of claim 19, wherein using the inode list and the configuration information to construct the filesystem at the disaster recovery site includes: performing a scale out backup and restore operation, wherein the network shared disks are used for the scale out backup and restore operation.

* * * * *